United States Patent
Asai et al.

(10) Patent No.: US 7,202,438 B2
(45) Date of Patent: Apr. 10, 2007

(54) ELECTRICAL DISCHARGE MACHINING APPARATUS

(75) Inventors: Yoshinori Asai, Tokyo (JP); Mitsuyoshi Wada, Tokyo (JP); Hidehiko Tanaka, Aichi (JP); Takashi Yuzawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/546,987

(22) PCT Filed: Mar. 1, 2004

(86) PCT No.: PCT/JP2004/002475

§ 371 (c)(1),
(2), (4) Date: Aug. 26, 2005

(87) PCT Pub. No.: WO2005/082565

PCT Pub. Date: Sep. 9, 2005

(65) Prior Publication Data

US 2006/0163210 A1    Jul. 27, 2006

(51) Int. Cl.
*B23H 7/20* (2006.01)
*B23H 1/02* (2006.01)

(52) U.S. Cl. .................. 219/69.13; 219/69.17
(58) Field of Classification Search ............... 700/162; 219/69.13, 69.16, 69.17
See application file for complete search history.

(56) References Cited

U.S. PATENT DOCUMENTS 3,997,753 A * 12/1976 Inoue ...................... 219/69.13
4,527,034 A * 7/1985 Inoue et al. ............. 219/69.16
4,582,974 A * 4/1986 Itoh ......................... 219/69.13
5,224,048 A * 6/1993 Ohba et al. ................. 700/162
5,276,302 A * 1/1994 Itoh ......................... 219/69.13
5,637,240 A * 6/1997 Izumiya et al. .......... 219/69.13
5,756,955 A * 5/1998 Goto et al. ............... 219/69.13
5,841,093 A * 11/1998 Wada ....................... 219/69.17
6,556,886 B1 * 4/2003 Riva et al. .................. 700/162
6,600,125 B1 * 7/2003 Boccadoro et al. ...... 219/69.13
6,791,055 B1 * 9/2004 Katougi ................... 219/69.13
6,907,311 B2 * 6/2005 Sendai et al. ............... 700/162
2003/0220710 A1 * 11/2003 Sendai et al. ............... 700/162
2006/0065638 A1 * 3/2006 Sasaki et al. ............. 219/69.13
2006/0138092 A1 * 6/2006 Chen et al. ............... 219/69.13

FOREIGN PATENT DOCUMENTS

| JP | 01-289624 A |   | 11/1989 |   |
|---|---|---|---|---|
| JP | 2-100822 A | * | 4/1990 | ............. 219/69.13 |
| JP | 4-53631 A | * | 2/1992 | ............. 219/69.17 |
| JP | 5-23916 A | * | 2/1993 | |
| JP | 05-293714 A |   | 11/1993 | |
| JP | 05-345229 A |   | 12/1993 | |
| JP | 9-76126 A | * | 3/1997 | |
| JP | 9-253943 A | * | 9/1997 | |
| JP | 10-296540 A | * | 11/1998 | |
| JP | 2001-062634 |   | 3/2001 | |
| JP | 2002-307241 A | * | 10/2002 | |
| JP | 2003-291032 A | * | 10/2003 | |

* cited by examiner

*Primary Examiner*—Geoffrey S. Evans
(74) *Attorney, Agent, or Firm*—Sughrue Mion, PLLC

(57) ABSTRACT

An electric-discharge machining apparatus for machining a workpiece by an electric discharge generated between a machining electrode and the workpiece, includes a correcting unit that corrects a machining amount input for machining the workpiece, based on a usage history of the machining electrode; and a control unit that controls a machining processing on the workpiece based on the machining amount corrected.

21 Claims, 16 Drawing Sheets

| | FACING AREA T | | | | |
|---|---|---|---|---|---|
| | 25mm² | 49mm² | 100mm² | 225mm² | 400mm² |
| MACHINING AMOUNT PER PULSE M2 | 15.8 | 21.3 | 22.4 | 21.8 | 19.7 |

FIG.17

| MACHINING CONDITIONS | MAXIMUM CURRENT (A) | CURRENT (A/SEC) | ESTIMATED-MACHINING-AMOUNT PER PULSE ($\mu g$) |
|---|---|---|---|
| ROUGH MACHINING | 35 | 11.67 | 33.84 |
| FINISHING MACHINING | 10 | 4.07 | 0.24 |

FIG.18

| NUMBER OF PULSES IN PREVIOUS ROUGH MACHINING | MACHINING AMOUNT IN PREVIOUS ROUGH MACHINING (mg) | NUMBER OF PULSES IN PRESENT ROUGH MACHINING | MACHINING AMOUNT IN PRESENT ROUGH MACHINING (mg) |
|---|---|---|---|
| 296 | 28.2 | 13595 | 465.4 |
| 887 | 52.8 | 13595 | 482.6 |
| 2660 | 109.1 | 13595 | 480.2 |
| 5024 | 192.3 | 13595 | 483.5 |
| 8571 | 316.2 | 13595 | 497.2 |
| 13595 | 497.2 | 13595 | 504.9 |

//

ELECTRICAL DISCHARGE MACHINING APPARATUS

TECHNICAL FIELD

The present invention relates to an electric-discharge machining apparatus for machining a workpiece by pulsed discharge.

BACKGROUND ART

In pulsed discharge machining, a machining voltage is applied between an electrode of an electric-discharge machining apparatus and a workpiece for machining the workpiece, and the workpiece is machined by a pulsed discharge energy generated during application of the voltage.

In the discharge machining on the workpiece performed by the electric-discharge machining apparatus, a machining accuracy and a removal amount for the workpiece change according to an electrode state and the like. It is, therefore, necessary to accurately detect the electrode state and the like so as to ensure an accurate machining before machining the workpiece.

To accurately machine the workpiece, there is known a technique for calculating a machining amount for the workpiece on the assumption that a discharge machining amount by one effective discharge pulse is constant, and for controlling machining on the workpiece based on the calculated machining amount.

A three-dimensional electric-discharge machining apparatus disclosed in Japanese Patent Application Laid-Open No. H5-345229 includes a counter circuit that detects pulsed discharges during a machining and that accumulates the detected discharges, and a signal converter circuit that converts a machining depth signal into a number-of-pulses signal corresponding to an energy set to a machining power supply according to a machined shape at a machining position on an XY plane. When the detected discharges counted by the counter circuit matches the number of pulses indicated by the signal obtained by the signal converter circuit, a servo-feeding of a servo head to which a pipe electrode is fixed is stopped.

Furthermore, to effectively machine the workpiece, there is known a technique for discriminating discharge pulses that effectively contribute to the machining from discharge pulses that does not effectively contribute to the machining, and for controlling the machining on the workpiece based on the number of discharge pulses effective for the machining.

An electric-discharge machining apparatus disclosed in Japanese Patent Application Laid-Open No. H5-293714 rectifies at least one alternating-current (AC) component or high frequency component among a current, a voltage, and an impedance in a machining gap, smoothes the rectified component, and thereby detecting a discharge state.

However, the removal amount for the workpiece by one effective discharge pulse differs according to a machining surface condition of an electrode for machining the workpiece, a change in a facing area of the electrode relative to the workpiece, a discharge pulse state, and the like. As a result, when the discharge machining amount is detected on the assumption that the discharge machining amount by one effective discharge pulse is constant as disclosed in the conventional techniques, an accurate electric discharge amount cannot be detected. Since the machining processing is controlled on the assumption that the removal amount for the workpiece by one effective discharge pulse is constant, the conventional techniques have a disadvantage in that an error occurs to the machining amount for the workpiece.

The present invention has been achieved in view of the conventional disadvantages. It is therefore an object of the present invention to provide an electric-discharge machining apparatus that corrects a removal amount for a workpiece set for performing a discharge machining according to an electrode state and the like, and that controls a machining processing on the workpiece based on the corrected removal amount.

DISCLOSURE OF THE INVENTION

An electric-discharge machining apparatus according to one aspect of the present invention, which is for machining a workpiece by an electric discharge generated between a machining electrode and the workpiece, includes a correcting unit that corrects a machining amount input for machining the workpiece, based on a usage history of the machining electrode; and a control unit that controls a machining processing on the workpiece based on the machining amount corrected.

BRIEF DESCRIPTION OF THE DRAWINGS

FIG. 17 depicts electric conditions for a rough machining and those for a finishing machining; and FIG. 18 depicts a relationship between a machining amount in a previous rough machining and that in a next (present) rough machining.

BEST MODE FOR CARRYING OUT THE INVENTION

Exemplary embodiments of an electric-discharge machining apparatus according to the present invention will be explained in detail with reference to the accompanying drawings. It should be noted that the invention is not limited to the present embodiments.

Figure 1:
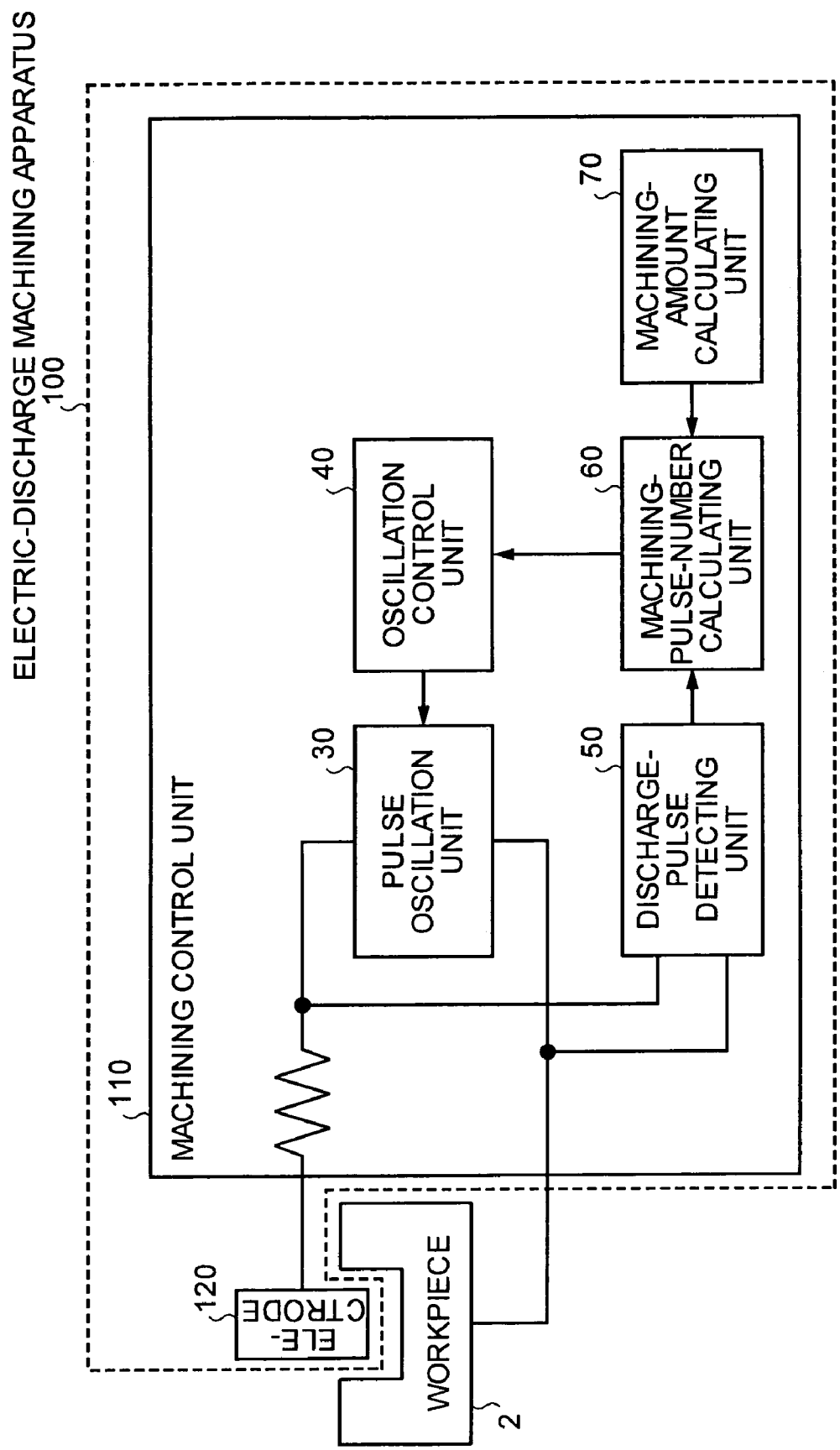
FIG. 1 depicts a configuration of an electric-discharge machining apparatus according to a first embodiment of the present invention.

A first embodiment of the present invention will be explained with reference to FIGS. 1 to 5. FIG. 1 depicts a configuration of an electric-discharge machining apparatus according to the first embodiment. The electric-discharge machining apparatus 100 is configured by a machining control unit 110 and an electrode 120.

The electrode 120 is used to perform a discharge machining on a workpiece 130 and includes, for example, tough pitch copper. A predetermined voltage is applied to the electrode 120 and the workpiece 130 disposed in a machining bath filled with a machining solution, thereby generating a pulsed discharge in a gap between the electrode 120 and the workpiece 130 and machining the workpiece 130. The workpiece 130 includes, for example, nickel alloy or iron (SKH51).

The machining control unit 110 controls the electrode 120 based on a sum of machining amounts by as much as which the electrode 120 has performed the machining processing on the workpiece 130 so far (hereinafter, "accumulated machining amount S"). The machining control unit 110 is configured by a pulse oscillation unit 30, an oscillation control unit (control unit) 40, a discharge-pulse detecting unit 50, a machining-pulse-number calculating unit 60, and a machining-amount calculating unit (correcting unit) 70.

The pulse oscillation unit 30 applies a voltage between the electrode 120 and the workpiece 130, thereby generating a predetermined pulsed discharge between the electrode 120 and the workpiece 130. The oscillation control unit 40 controls the pulse oscillation unit 30 based on indication information from the machining-pulse-number calculating unit 60.

The discharge-pulse detecting unit 50 detects effective discharge pulses generated in a gap between the electrode 120 and the workpiece 130. The discharge-pulse detecting unit 50 rectifies and then integrates high frequency components of a voltage waveform generated in the machining gap, thereby detecting a magnitude of the high frequency components as a voltage level. The discharge-pulse detecting unit 50 determines that discharge pulses are effective discharge pulses when the high frequency components are distributed to a higher integrated output side (during a stable machining). When detecting the effective discharge pulses, the discharge-pulse detecting unit 50 transmits a pulse detection signal to the machining-pulse-number calculating unit 60.

The machining-amount calculating unit 70 calculates a machining amount necessary for machining the workpiece 130 based on the accumulated machining amount S in the machining processing performed by the electrode 120, calculates the number of discharge pulses necessary for machining the workpiece 130 from the calculated machining amount, and transmits the calculated number of discharge pulses to the machining-pulse-number calculating unit 60.

The machining-pulse-number calculating unit 60 counts effective discharge pulse detection signals transmitted from the discharge-pulse detecting unit 50. When the number of detection signals reaches the number of discharge pulses transmitted from the machining-amount calculating unit 70, then the machining-pulse-number calculating unit 60 transmits indication information for stopping the pulse oscillation unit 30 to the oscillation control unit 40.

Figure 2:
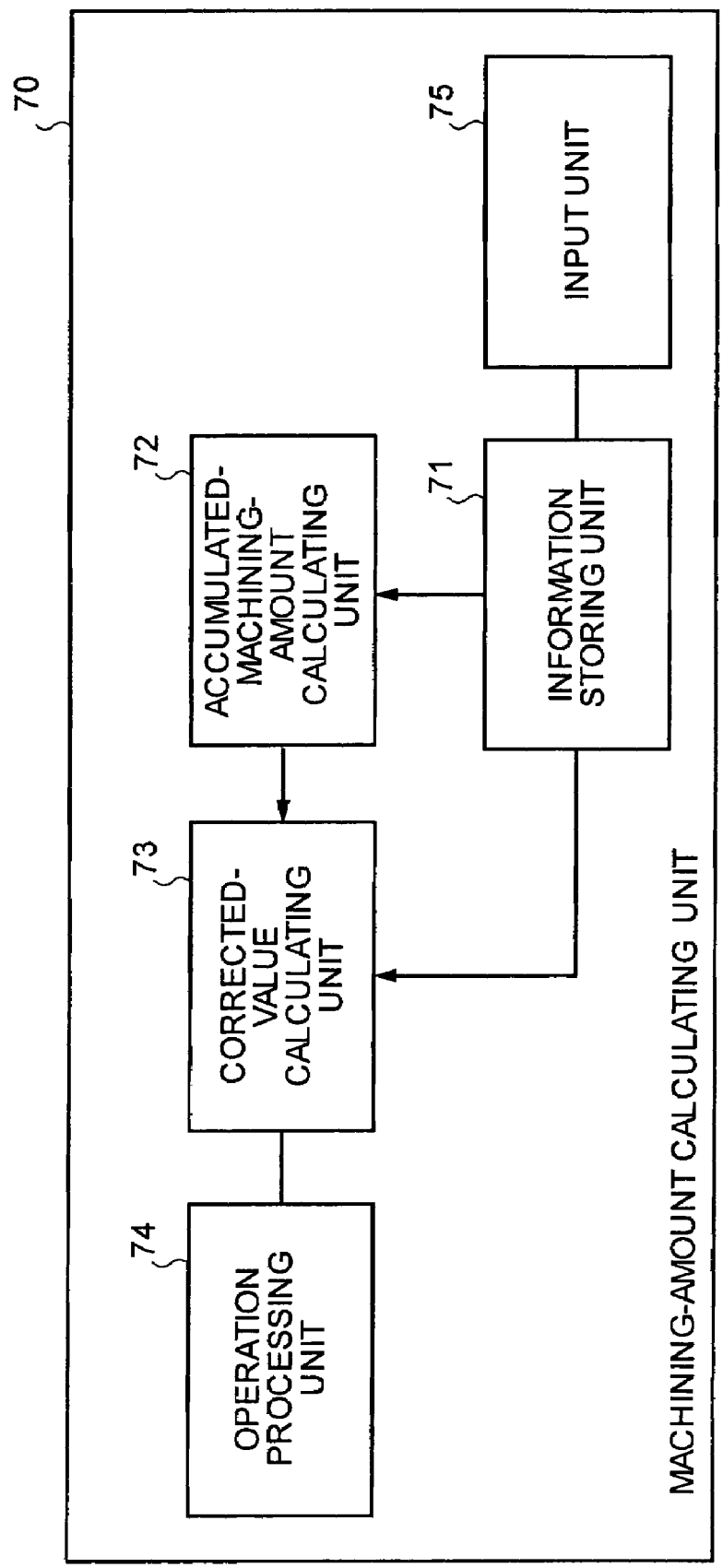
FIG. 2 is a functional block diagram that depicts functions of a machining-amount calculating unit according to the first embodiment.

FIG. 2 is a functional block diagram that depicts functions of the machining-amount calculating unit according to the first embodiment. As shown in FIG. 2, the machining-amount calculating unit 70 is configured by an information storing unit 71, an accumulated-machining-amount calculating unit 72, a corrected-value calculating unit 73, an operation processing unit 74, and an input unit 75.

The input unit 75 inputs the machining amount necessary for the workpiece 130 as an indicated machining amount A when the discharge machining is performed on the workpiece 130. The information storing unit (storing unit) 71 stores the indicated machining amount A for the workpiece 130 input to the input unit 75.

The accumulated-machining-amount calculating unit 72 calculates (updates) the accumulated machining amount S of the electrode 120 based on the indicated machining amount A transmitted from the information storing unit 71 after the machining on the workpiece 130 is finished. The accumulated machining amount S of the electrode 120 is reset when the electrode 130 is replaced by a new electrode.

The corrected-value calculating unit 73 makes a predetermined correction to the indicated machining amount A stored in the information storing unit 71 based on the accumulated machining amount S transmitted from the accumulated-machining-amount calculating unit 72, and transmits the corrected indicated machining amount A to the operation processing unit 74 as a corrected machining amount B1. The operation processing unit 74 converts the corrected machining amount B1 transmitted from the corrected-value calculating unit 73 into the number of effective discharge pulses (hereinafter, "the number of indicated effective discharge pulses") N1 necessary for the machining.

Figure 3:
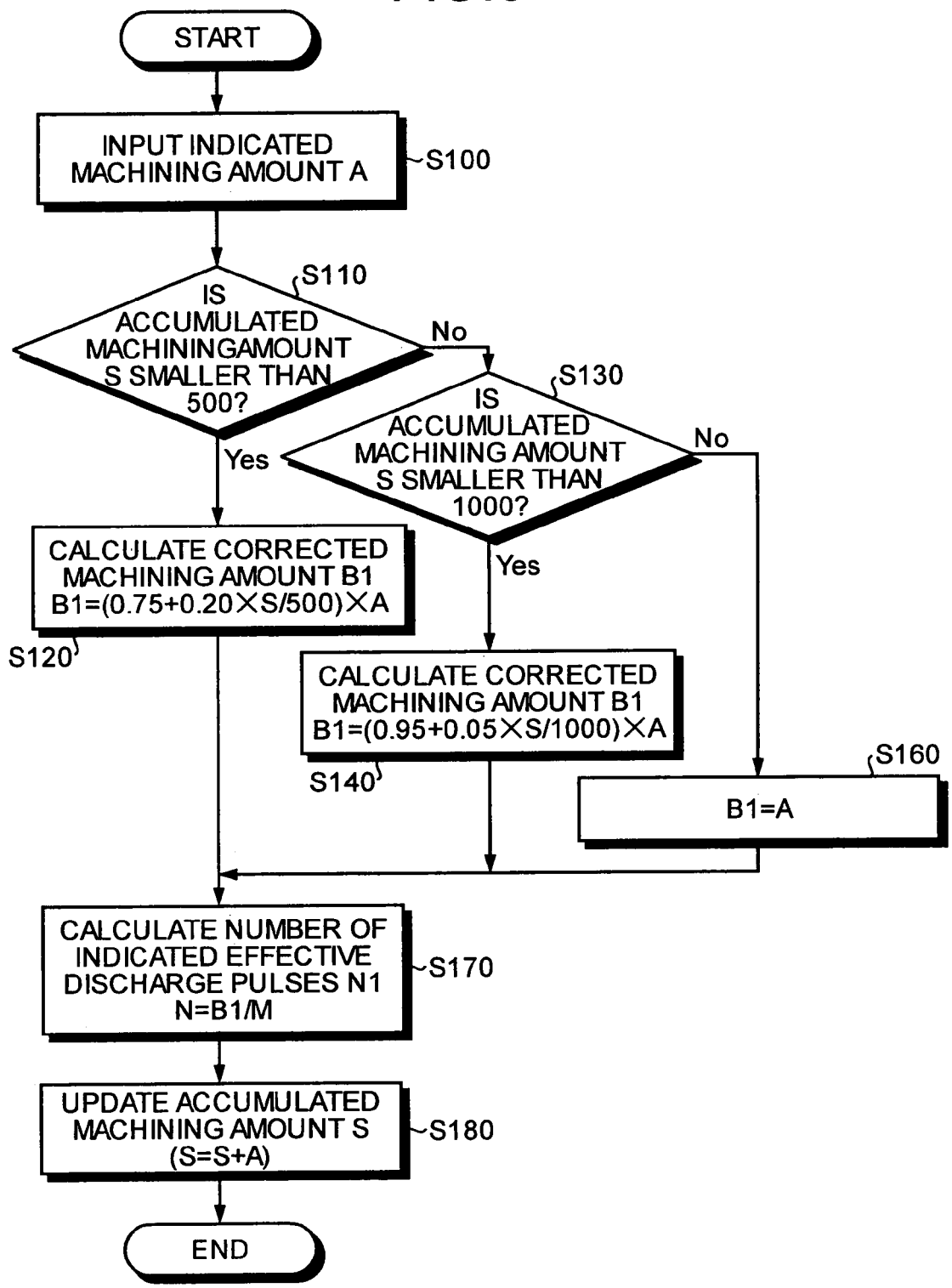
FIG. 3 is a flowchart of operation procedures of the electric-discharge machining apparatus according to the first embodiment.

FIG. 3 is a flowchart of operation procedures of the electric-discharge machining apparatus according to the first embodiment. A user of the electric-discharge machining apparatus 100 inputs the machining amount necessary for machining the workpiece 130 to the input unit 75 as the indicated machining amount A (at step S100). The indicated machining amount A input to the input unit 75 is transmitted to the corrected-value calculating unit 73. In addition, the accumulated machining amount S stored in the accumulated-machining-amount calculating unit 72 in advance is transmitted to the corrected-value calculating unit 73.

Figure 4:
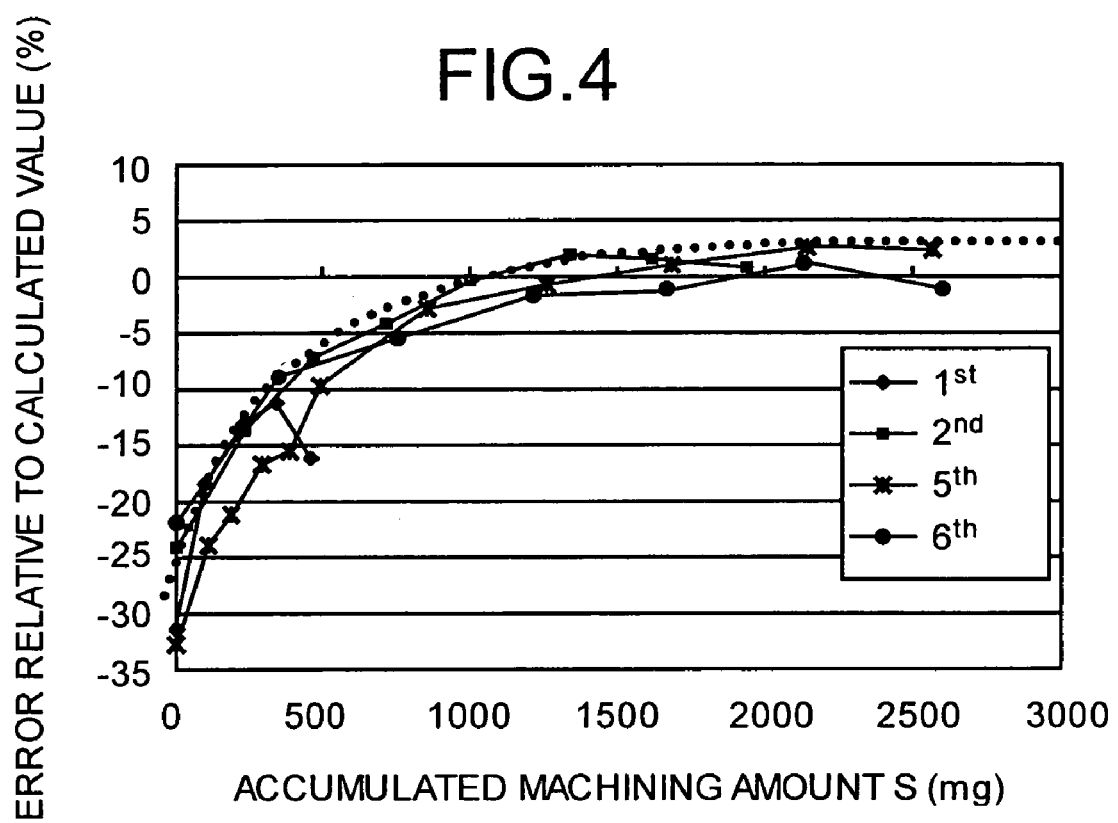
FIG. 4 depicts a relationship between an accumulated machining amount of an electrode and a machining amount per pulse.

A machining amount correction processing performed by the machining-amount calculating unit 70 will now be explained. FIG. 4 depicts a relationship between the accumulated machining amount of the electrode and the machining amount per pulse. In FIG. 4, a vertical axis indicates the machining amount (calculated value) calculated on the assumption that the machining amount per effective discharge pulse (hereinafter, "machining amount per pulse") is constant, and an error relative to an actual machining amount (actually measured value). The calculated value indicates the machining amount calculated based on a machining amount M1 per pulse of the electrode 120 in a state in which the electrode 120 has been used for some time and turned stable. A horizontal axis indicates the accumulated machining amount S. The accumulated machining amount S signifies a total machining weight by as much as which the electrode 120 machines the workpiece 130.

As shown in FIG. 4, when the electrode 120 in a new state (accumulated machining amount S=0) machines the workpiece 130, the machining amount per discharge pulse increases according to an increase in the accumulated machining amount S. The actual machining amount, therefore, increases according to the increase in the accumulated machining amount S. The actual machining amount gradually converges and becomes substantially equal to the calculated value.

For example, when the accumulated machining amount is, for example, 500 milligrams, an error relative to the calculated value is about −10, and thus indicates that the workpiece 130 is machined by as much as the actual machining amount which is 10% lower than the estimated machining amount (calculated value).

As can be seen, as the electrode 120 performs the discharge machining processing from the new state, the machining amount per pulse changes. According to the first embodiment, therefore, the indicated machining amount A is corrected based on the accumulated machining amount S in the machining processing performed by the electrode 120, and the machining processing is controlled based on the corrected machining amount B1.

Referring back to FIG. 3, the corrected-value calculating unit 73 corrects the indicated machining amount A based on the accumulated machining amount S. According to the first embodiment, the corrected-value calculating unit 73 corrects the indicated machining amount A based on an experimental result shown in FIG. 4 and calculates the corrected machining amount B1 so that the workpiece 130 is actually machined by as much as the indicated machining amount A irrespective of the accumulated machining amount S. When the accumulated machining amount S satisfies, for example, S<500 milligrams, the corrected-value calculating unit 73 calculates the corrected machining amount B1 based on Eq. (1).

$$B1=(0.75+0.20 \times S/500) \times A \quad (1)$$

When the accumulated machining amount S satisfies, for example, 500 milligrams $\leq$ S<1000 milligrams, the corrected-value calculating unit 73 calculates the corrected machining amount B1 based on Eq. (2).

$$B1=(0.95+0.05 \times S/1000) \times A \quad (2)$$

When the accumulated machining amount S satisfies, for example, S$\geq$1000 milligrams, the corrected-value calculating unit 73 calculates the corrected machining amount B1 based on Eq. (3).

$$B1=A \quad (3)$$

In this calculation, since an average error rate of the indicated machining amount relative to the calculated value at the accumulated machining amount of 0 milligram is about 25%, a value 0.75 is used in the Eq. (1). Since an average error rate of the indicated machining amount relative to the calculated value at the accumulated machining amount of 500 milligrams is about 5%, a value 0.95 is used in the Eq. (2). Since there is hardly an error between the indicated machining amount and the calculated value at the accumulated machining amount of 1000 milligrams or more, the indicated machining amount is not corrected in the Eq. (3).

The corrected-value calculating unit 73 confirms whether the accumulated machining amount S satisfies the condition of S<500 milligrams (at step S110). When the accumulated machining amount S satisfies the condition of S<500 milligrams, the corrected-value calculating unit 73 calculates the corrected machining amount B1 based on the Eq. (1) (at step S120).

When the accumulated machining amount S does not satisfy the condition of S<500 milligrams, the corrected-value calculating unit 73 confirms whether the accumulated machining amount S satisfies the condition of 500 milligrams$\leq$S<1000 milligrams (at step S130). When the accumulated machining amount S satisfies the condition of 500 milligrams$\leq$S<1000 milligrams, the corrected-value calculating unit 73 calculates the corrected machining amount B1 based on the Eq. (2) (at step S140).

When the accumulated machining amount S satisfies neither S<500 milligrams nor 500 milligrams$\leq$S<1000 milligrams, then the corrected-value calculating unit 73 determines that the accumulated machining amount S satisfies S$\geq$1000 milligrams, and calculates the corrected machining amount B1 from the indicated machining amount A based on the Eq. (3) (at step S160).

The corrected machining amount B1 calculated by the corrected-value calculating unit 73 is transmitted to the operation processing unit 74. The operation processing unit 74 converts the corrected machining amount B1 transmitted from the corrected-value calculating unit 73 into the number of indicated effective discharge pulses N1. The number of indicated effective discharge pulses N1 is obtained by dividing the corrected machining amount B1 by the machining amount M1 per effective discharge pulse (at step S170).

The number of indicated effective discharge pulses N1 obtained by the operation processing unit 74 is transmitted to the machining-pulse-number calculating unit 60, and the electric-discharge machining apparatus 100 thus starts the discharge machining processing on the workpiece 130. The discharge-pulse detecting unit 50 detects effective discharge pulses generated in the gap between the electrode 120 and the workpiece 130, and transmits the pulse detection signals to the machining-pulse-number calculating unit 60.

The machining-pulse-number calculating unit 60 counts the pulse detection signals transmitted from the discharge-pulse detecting unit 50, and compares the counted number of effective discharge pulses with the number of indicated effective discharge pulses N1 transmitted from the operation processing unit 74 at real time. When the counted number of effective discharge pulses matches the number of indicated effective discharge pulses N1 transmitted from the operation processing unit 74, the machining-pulse-number calculating unit 60 transmits information on an indication to end oscillation to the oscillation control unit 40. The oscillation control unit 40 controls the pulse oscillation unit 30 to stop pulsed discharge in response to the oscillation end indication information transmitted from the machining-pulse-number calculating unit 60, thus finishing the discharge machining processing.

After the discharge machining processing is finished, the indicated machining amount A for the workpiece 130 stored in the information storing unit 71 is transmitted to the accumulated-machining-amount calculating unit 72. The accumulated-machining-amount calculating unit 72 adds the indicated machining amount A to the accumulated machining amount S already stored therein, thereby calculating and storing a new accumulated machining amount S obtained after machining the workpiece 130 (at step S180).

Figure 5:
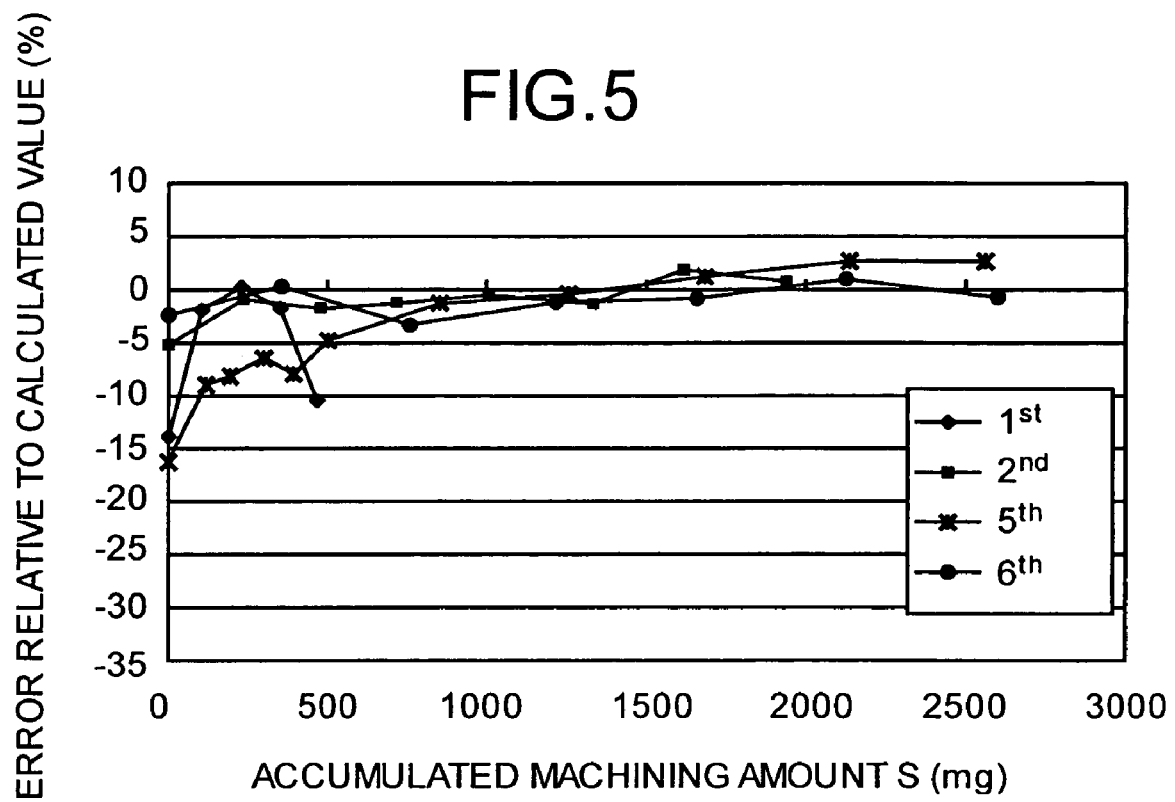
FIG. 5 depicts a relationship between the accumulated amount of the electrode and the machining amount per pulse when the machining-amount calculating unit corrects an indicated machining amount.

FIG. 5 depicts one example of a relationship between the accumulated machining amount of the electrode and the machining amount per pulse when the machining-amount calculating unit corrects the indicated machining amount. In FIG. 5, a vertical axis indicates the calculated machining amount (calculated value) on the assumption that the machining amount per pulse is constant and an error relative to the actual machining amount (actually measured value). A horizontal axis indicates the accumulated machining amount S. A comparison between FIGS. 4 and 5 indicates that at the accumulated machining amount of 1000 milligrams or less, the error rate of the calculated value to the actually measured value when the machining-amount calculating unit 70 corrects the indicated machining amount A decreases.

According to the first embodiment, the indicated machining amount is corrected using one of the Eqs. (1) to (3). However, the correction to the indicated machining amount is not limited to those using the Eqs. (1) to (3). The indicated machining amount can be corrected using the other correction equation, or the like.

While according to the first embodiment, the electric-discharge machining apparatus 100 is configured to calculate the accumulated machining amount according to the machining weight, the electric-discharge machining apparatus 100 can be also configured to calculate the accumulated machining amount S according to a total number of times of machining, a total machining time, or a total number of machining pulses for the workpiece 130.

According to the first embodiment, after the indicated machining amount A is corrected to the corrected machining amount B1, the number of indicated discharge pulses N1 is calculated. Alternatively, the machining amount M1 per pulse can be corrected based on the accumulated machining amount S, and the number of indicated discharge pulses N1 can be calculated based on the indicated machining amount A and the corrected machining amount M1.

According to the first embodiment, the indicated machining amount A is corrected according to the accumulated discharge machining amount of the electrode 120. The actual machining amount of the electrode 120 can be, therefore, accurately detected, and the discharge machining can be accurately controlled.

A second embodiment of the present invention will be explained with reference to FIG. 1 and FIGS. 6 to 12. According to the second embodiment, the indicated machining amount A is corrected according to a change in a facing area T of the electrode 120 relative to the workpiece 130.

Figure 6:
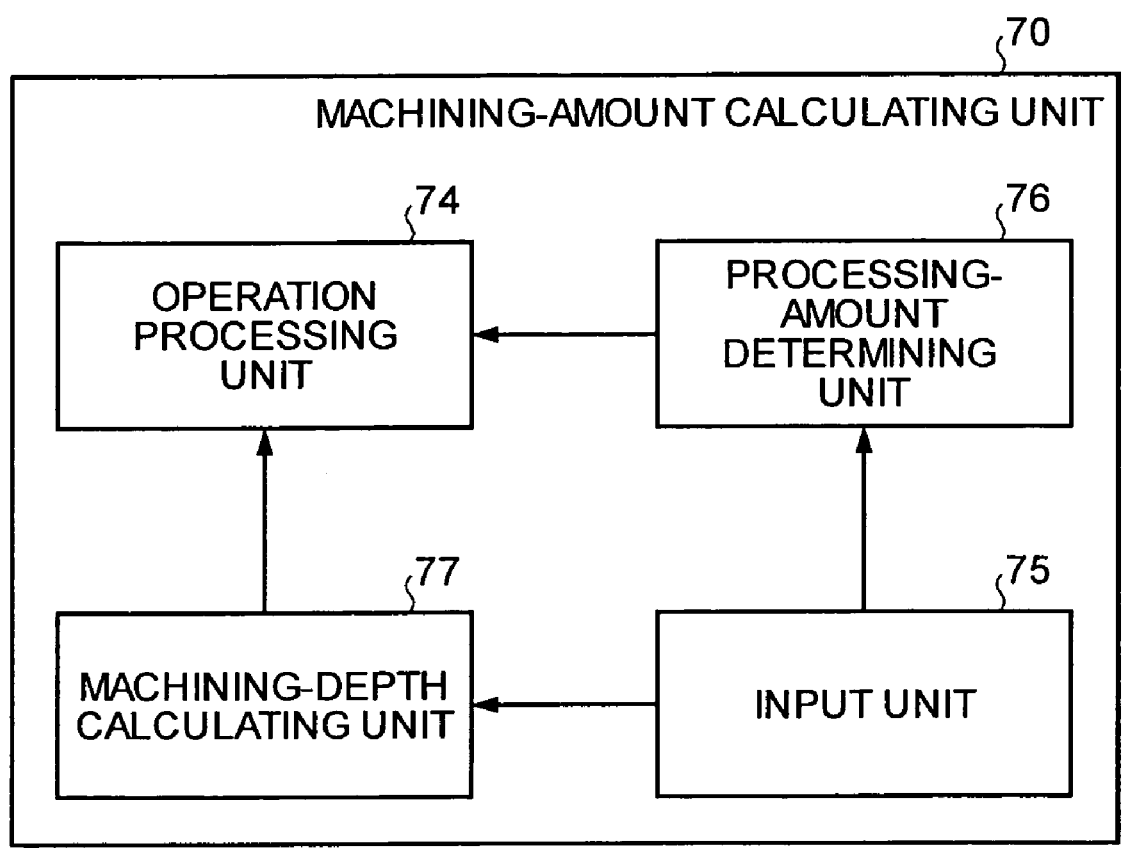
FIG. 6 is a functional block diagram that depicts functions of the machining-amount calculating unit according to a second embodiment.

FIG. 6 is a functional bock diagram that depicts functions of the machining-amount calculating unit according to the second embodiment. Among all constituent elements shown in FIG. 6, the constituent elements that attain the same functions as those of the machining-amount calculating unit according to the first embodiment shown in FIG. 2 are designated with like reference signs, respectively, and redundant explanations thereof will be omitted.

As shown in FIG. 6, the machining-amount calculating unit 70 is configured by the operation processing unit 74, the input unit 75, a processing-amount determining unit 76, and a machining-depth calculating unit 77. The machining-amount determining unit 76 determines a correction equation for correcting the machining amount per pulse based on the indicated machining amount A for the workpiece 130 input to the input unit 75, and transmits information on the determined correction equation to the operation processing unit 74.

The machining-depth calculating unit 77 calculates a machining depth H based on the indicated machining amount A for every machining condition. The machining depth H means a distance from a bottom of the machining electrode 120 to an upper surface of the workpiece 130.

The operation processing unit 74 calculates a machining amount per pulse M2 based on the machining depth H calculated by the machining-depth calculating unit 77 and on the information on the correction equation transmitted from the machining-amount determining unit 76. In addition, the operation processing unit 74 converts the indicated machining amount A into the number of indicated effective discharge pulses N1.

Figure 7:
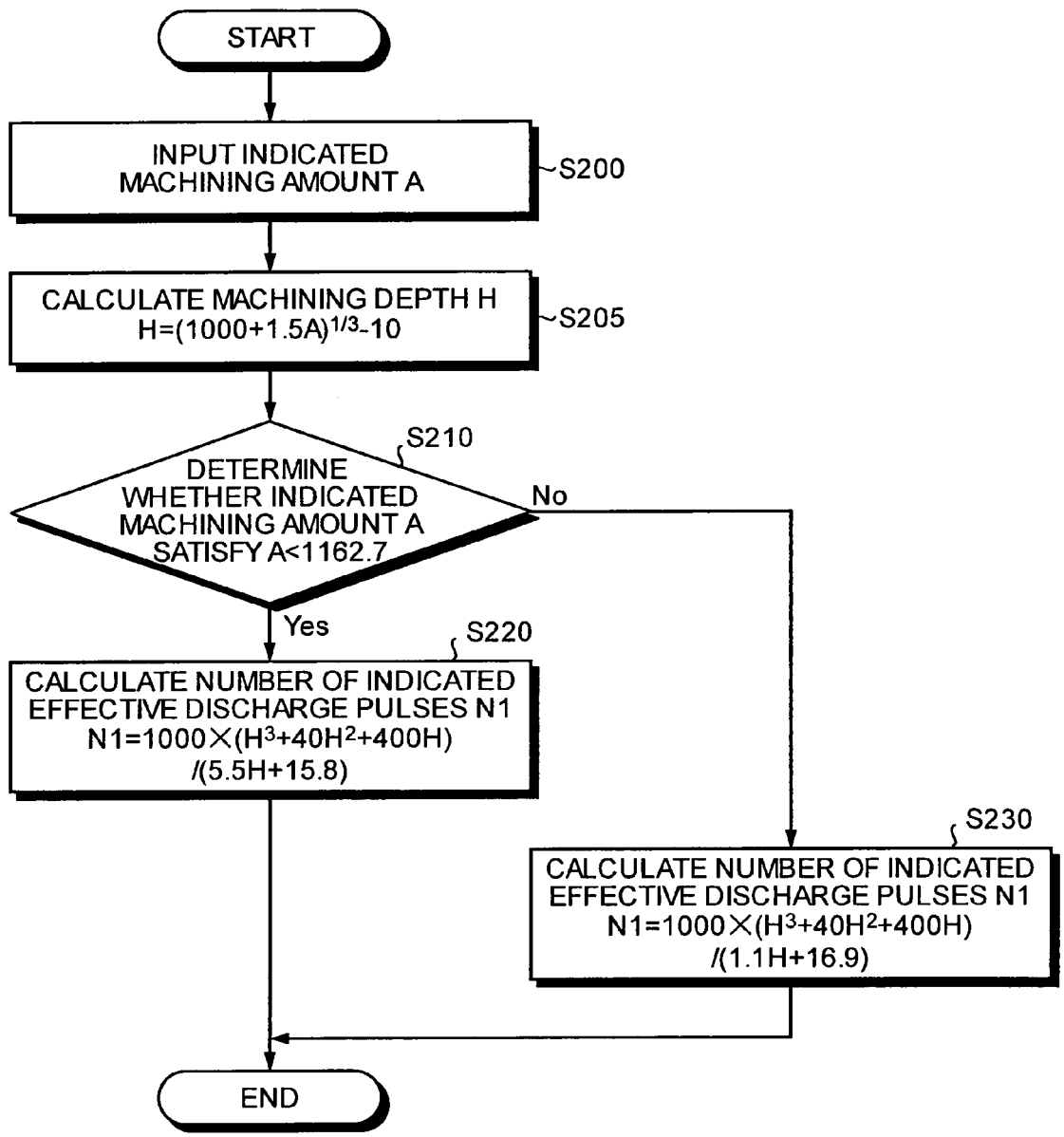
FIG. 7 is a flowchart of operation procedures of the electric-discharge machining apparatus according to the second embodiment.

FIG. 7 is a flowchart of operation procedures of the electric-discharge machining apparatus according to the second embodiment. The user of the electric-discharge machining apparatus 100 inputs the machining amount necessary for machining the workpiece 130 to the input unit 75 as the indicated machining amount A (at step S200). The indicated machining amount A input to the input unit 75 is transmitted to the machining-amount determining unit 76 and the machining-depth calculating unit 77.

Figure 8:
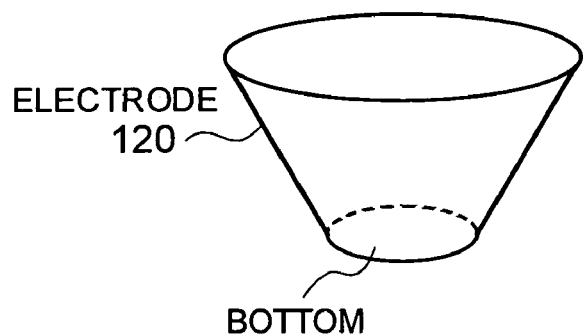
FIG. 8 depicts a shape of the electrode.
Figure 9:
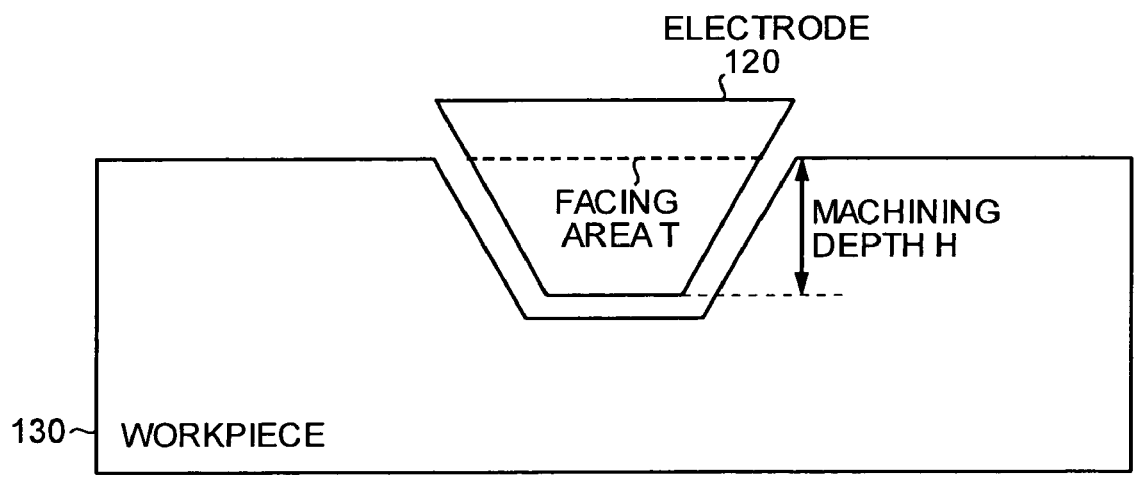
FIG. 9 is a cross-section of the electrode and the workpiece during a machining processing.
Figures 10, 11:
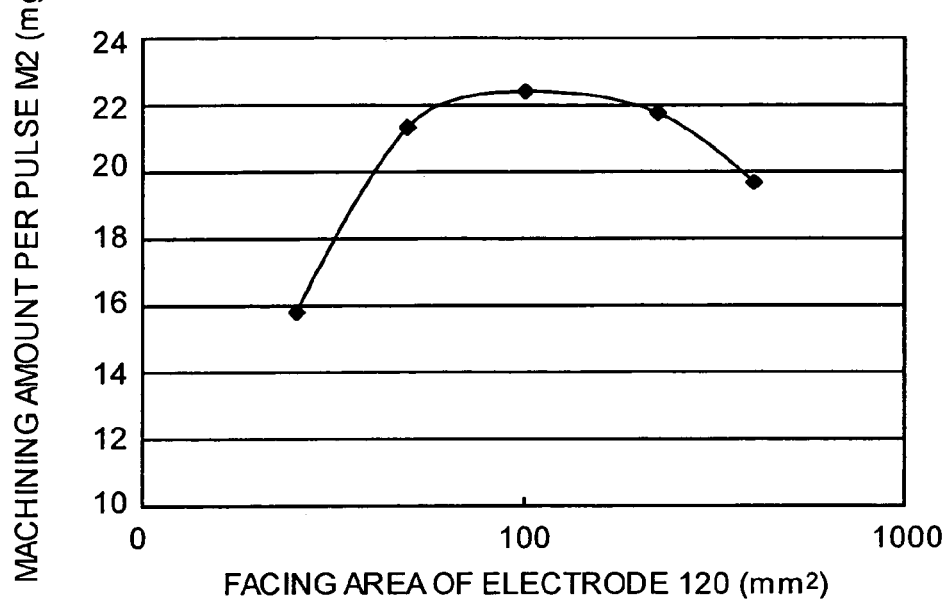
FIG. 10 depicts a relationship between a facing area of the electrode relative to the workpiece and the machining amount per pulse.
FIG. 11 depicts the relationship between the facing area of the electrode relative to the workpiece and the machining amount per pulse.

A relationship between the facing area T of the electrode 120 relative to the workpiece 130 and the machining amount per pulse will now be explained. FIG. 8 depicts a shape of the electrode. FIG. 9 is a cross-section of the electrode and the workpiece during the machining processing. FIG. 10 depicts the relationship between the facing area T of the electrode 120 relative to the workpiece 130 and the machining amount per pulse.

As shown in FIG. 9, the electrode 120 performs the machining processing on the workpiece 130 while the electrode 120 is put into the workpiece 130 by the machining depth H. An area of the electrode 120 on the same plane as the upper surface of the workpiece 130 corresponds to the facing area T.

In FIG. 10, a horizontal axis indicates the facing area T of the electrode 120 relative to the workpiece 130, and a vertical axis indicates the machining amount M2 per pulse. As shown in FIG. 10, the machining amount M2 per pulse draws a two-dimensional curve relative to the facing area T.

When the facing area T of the electrode 120 relative to the workpiece 130 changes (the shape and the machining depth H of the electrode 120 change) as shown in FIG. 10, the machining amount M2 per pulse changes accordingly. As a result, the relationship between the actual machining amount and the number of discharge pulses is not expressed by a line. To provide an accurate machining, therefore, it is necessary to calculate the machining amount M2 per pulse according to the machining amount for the workpiece 130 and the facing area T of the electrode 120 relative to the workpiece 130, and to perform the discharge machining processing.

A case that the indicated machining amount A of the electrode 120 having the relationship shown in FIG. 11 is corrected based on the facing area T and the machining amount M2 per pulse will be explained. FIG. 11 depicts the relationship between the facing area of the electrode relative to the workpiece and the machining amount per pulse.

The shape of the electrode 120 in a case that when the machining depth of the electrode 120 is 0 millimeter, the facing area T is 25 $mm^2$, that in which when the machining depth of the electrode 120 is 4 millimeters, the facing area T is 49 $mm^2$, and that in which when the machining depth of the electrode 120 is 10 millimeters, the facing area T is 100 $mm^2$ will be explained. It is assumed that a current density per unit time carried between the electrode 120 and the workpiece 130 is a constant value, for example, 18.8 (A/sec).

Referring back to FIG. 7, the machining-depth calculating unit 77 calculates the machining depth H corresponding to the indicated machining amount A based on the shape of the electrode 120 (at step S205). The indicated machining amount A is represented by Eq. (4) when a specific gravity of the workpiece 130 is 8.0 (g/cm³).

$$\int (5+H/2)^2 dH = A/8 \quad (4)$$

The machining dept H can be obtained by Eq. (5) that is a rearranged from the Eq. (4).

$$H^3 + 30H^2 + 300H = 1.5 A \quad (5)$$

The machining depth H can be obtained by Eq. (6) that solves a cubic of this Eq. (5).

$$H = (1000 + 1.5 A)^{1/3} - 10 \quad (6)$$

Accordingly, when the workpiece 130 is machined by as much as the machining amount≅1162.7 milligrams, the machining depth H reaches 4 millimeters. When the workpiece 130 is machined by as much as the machining amount≅4666.7 milligrams, the machining depth H reaches 10 millimeters.

The machining-amount determining unit 76 determines the correction equation for correcting the machining amount per pulse based on the machining depth H calculated from the indicated machining amount A. As indicated by the relationship shown in FIG. 11, the machining amount P (μg) per pulse can be corrected according to the machining depth H as represented by, for example, the following Eqs. (7) and (8).

When the machining depth H satisfies H<4 millimeters, $$P = 15.8 + (21.3 - 15.8) \times H \quad (7)$$

When the machining depth H satisfies 4 millimeters≤H<10 millimeters, $$P = 21.3 + (22.4 - 21.3) \times (H - 4) \quad (8)$$

The machining depth is calculated as represented by the Eq. (6) using the indicated machining amount A. Furthermore, the number of indicated pulses N1 is calculated as represented by Eqs. (9) and (10) using this intended machining depth H.

When the indicated machining amount A satisfies A<1162.7 milligrams, $$N1 = ((\text{Specific Gravity}) \times (\text{Facing area}) \times (\text{Depth})/(\text{Machining Amount per Pulse}) = 8SH/P = 2000 \times (H^3 + 40H^2 + 400H)/(5.5H + 15.8) \quad (9)$$

When the indicated machining amount A satisfies 1162.7 milligrams≤A<4666.7 milligrams, $$N1 = 8SH/P = 2000 \times (H^3 + 40H^2 + 400H)/(1.1H + 16.9) \quad (10)$$

When the indicated machining amount A satisfies A≥4666.7 milligrams, the machining depth H is equal to or larger than 10 millimeters, and the electrode 120 does not, therefore, perform the machining processing.

When the machining amount per discharge pulse is corrected using, for example, the Eq. (7) or (8), the machining-amount determining unit 76 determines whether the indicated machining amount A satisfies the condition of A<1162.7 milligrams for determining the correction equation. (at step S210).

When determining that the indicated machining amount A satisfies the condition of A<1162.7 milligrams ("Yes" at step S210), the machining-amount determining unit 76 notifies the operation processing unit 74 that the indicated machining amount A satisfies "A<1162.7 milligrams".

When determining that the indicated machining amount A does not satisfy the condition of A<1162.7 milligrams ("No" at step, S210), the machining-amount determining unit 76 notifies the operation processing unit 74 that the indicated machining amount A satisfies "1162.7 milligrams≤A".

The operation processing unit 74 calculates the number of indicated discharge machining pulses N1 based on the machining depth H calculated by the machining-depth calculating unit 73 and on the notification from the machining-amount determining unit 76 using the Eqs. (6) and (9) when the amount A satisfies A<1162.7 milligrams (at step S220). The operation processing unit 74 calculates the number of indicated discharge machining pulses N1 using the Eqs. (6) and (10) when the amount A satisfies 1162.7 milligrams≤A<4666.7 milligrams (at step S230).

The number of indicated effective discharge pulses N1 calculated by the operation processing unit 74 is transmitted to the machining-pulse-number calculating unit 60. The oscillation control unit 40 controls the pulse oscillation unit 30 based on the number of effective discharge pulses detected by the discharge-pulse detecting unit 50 and on the number of indicated effective discharge pulses N1 transmitted from the operation processing unit 74.

As can be seen, the number of indicated effective discharge pulses N1 is calculated based on the indicated machining amount A. Therefore, even if a height of the upper surface of the workpiece 130 differs according to machining processings or a discharge start position changes according to a change in horizontality of the workpiece 130, the electrode 120 can accurately perform the machining processing on the workpiece 130.

Since the machining depth H can be calculated from the indicated machining amount A, the machining processing can be controlled based on the machining depth H when the height of the upper surface of the workpiece 130, the discharge start position or the like has smaller change.

According to the second embodiment, the indicated machining amount A is corrected using the Eqs. (4) to (10). However, the correction to the indicated machining amount A is not limited that using the Eqs. (4) to (10) and the indicated machining amount A can be corrected using the other correction equation or the like.

As explained above, according to the second embodiment, the machining depth H is calculated based on the indicated machining amount A, and the number of indicated effective discharge pulses N1 is calculated based on the machining depth H. The machining amount can be, therefore, accurately controlled according to the facing area T. Accordingly, even a machining processing, such as a processing for removing a part of the workpiece 130 by the discharge processing, required to have a high machining accuracy can be performed accuracy.

A third embodiment of the present invention will be explained with reference to FIGS. 12 to 14. According to the third embodiment, the discharge-pulse detecting unit 50 detects quasi-arc discharge pulses and arc discharge pulses, to be explained later, as well as the effective discharge pulses. Based on the machining amount per pulse of all types of these discharge pulses, the machining amount by as much as which the workpiece 130 is now being machined is calculated and the machining on the workpiece 130 is controlled.

Figure 12:
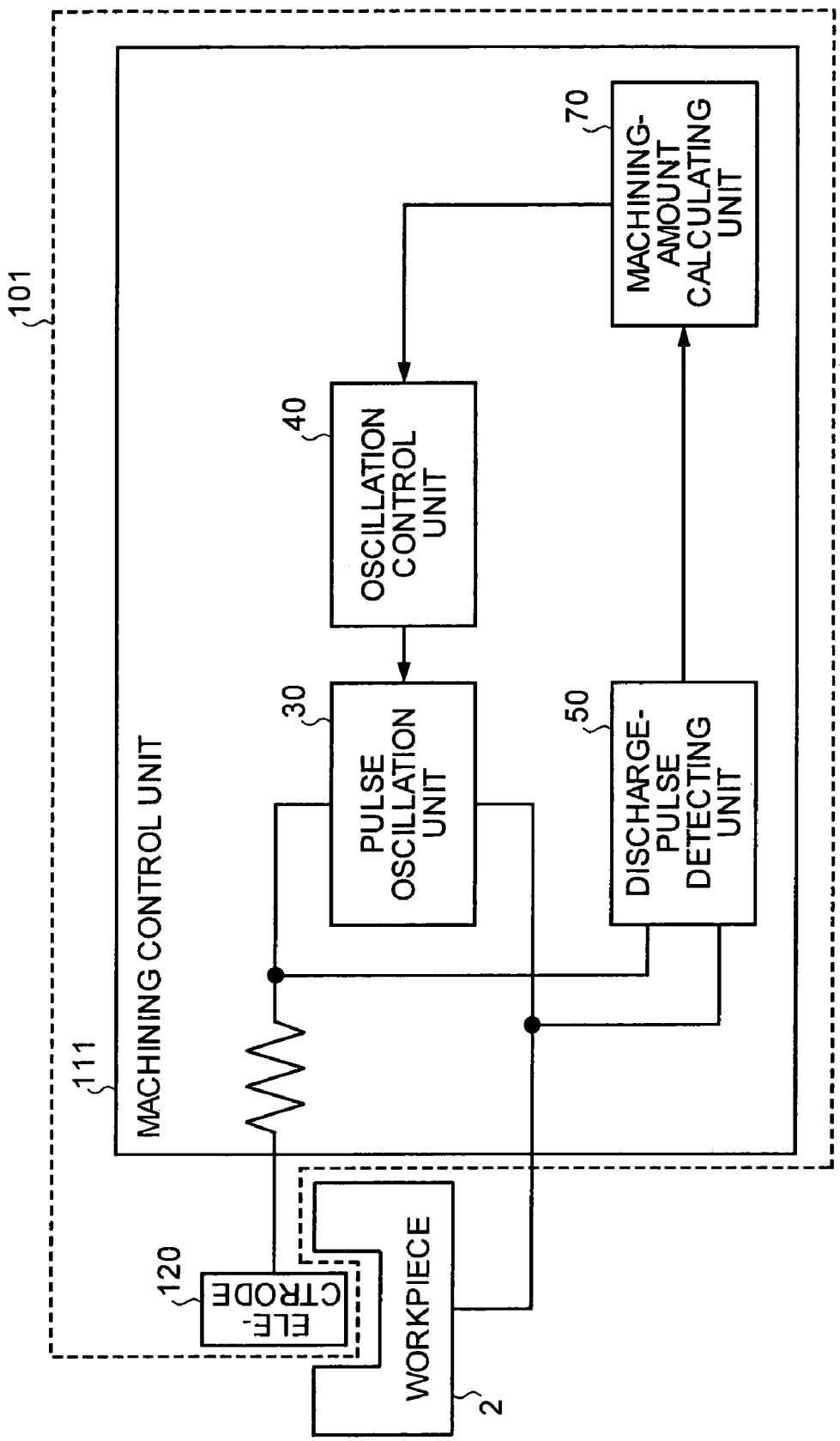
FIG. 12 depicts a configuration of the electric-discharge machining apparatus according to a third embodiment.

FIG. 12 depicts a configuration of an electric-discharge machining apparatus according to the third embodiment. FIG. 13 is a functional block diagram that depicts functions of the machining-amount calculating unit according to the third embodiment. Among all constituent elements shown in FIGS. 12 and 13, the constituent elements that attain the same functions as those of the electric-discharge machining apparatus shown in FIG. 1 and the machining-amount calculating unit shown in FIG. 2 are designated with like reference signs, respectively, and redundant explanations thereof will be omitted.

As shown in FIG. 12, in a machining control unit 111 (control unit) of the electric-discharge machining apparatus 101, the machining-amount calculating unit 70 is connected to the oscillation control unit 40 and the discharge-pulse detecting unit 50. The discharge-pulse detecting unit 50 detects effective discharge pulses, quasi-arc discharge pulses, and arc discharge pulses.

Figure 13:
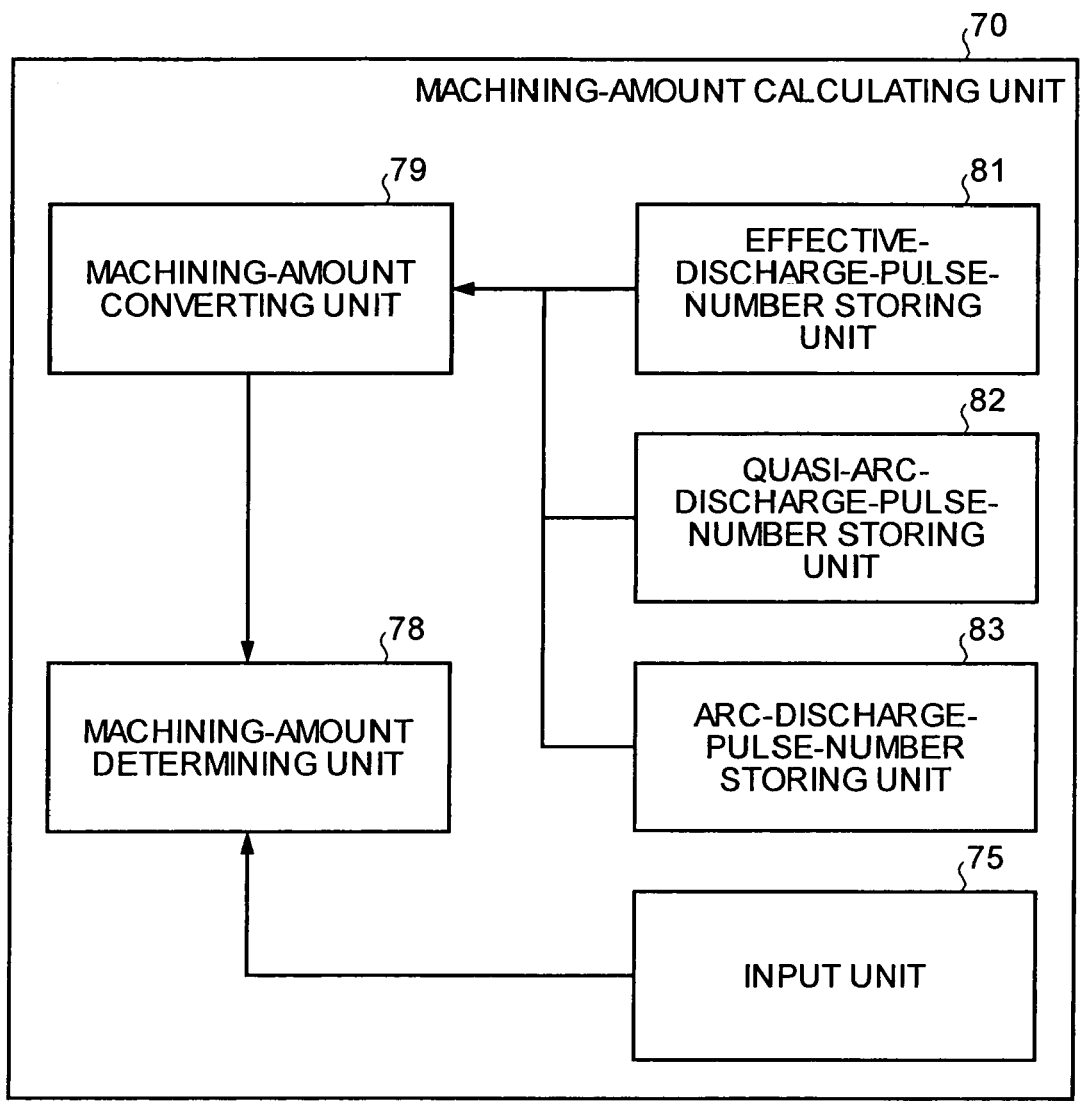
FIG. 13 is a functional block diagram that depicts functions of the machining-amount calculating unit according to the third embodiment.

As shown in FIG. 13, the machining-amount calculating unit 170 is configured by the input unit 75, a machining-amount determining unit 78, an effective-discharge-pulse-number storing unit 81, a quasi-arc-discharge-pulse-number storing unit 82, an arc-discharge-pulse-number storing unit 83, and a machining-amount converting unit (calculating unit) 79.

The effective-discharge-pulse-number storing unit 81 counts detection signals transmitted from the discharge-pulse detecting unit 50 in response to the effective discharge pulses detected by the discharge-pulse detecting unit 50. In addition, the effective-discharge-pulse-number storing unit 81 stores the counted number of effective discharge pulses as the number of effective discharge pulse x.

The quasi-arc-discharge-pulse-number storing unit 82 counts detection signals transmitted from the discharge-pulse detecting unit 50 in response to the quasi-arc discharge pulses detected by the discharge-pulse detecting unit 50. In addition, the quasi-arc-discharge-pulse-number storing unit 82 stores the counted number of quasi-arc discharge pulses as the number of quasi-arc discharge pulse y.

The arc-discharge-pulse-number storing unit 83 counts detection signals transmitted from the discharge-pulse detecting unit 50 in response to the arc discharge pulses detected by the discharge-pulse detecting unit 50. In addition, the quasi-arc-discharge-pulse-number storing unit 82 stores the counted number of arc discharge pulses as the number of arc discharge pulse z.

The machining-amount converting unit 79 calculates a machining amount (machining amount Q to be explained later) by which the workpiece 130 is now being machined based on the machining amount per pulse calculated in advance for each of three types of discharge pulses.

The machining-amount determining unit 78 compares the machining amount Q transmitted from the machining-amount converting unit 79 with the indicated machining amount A transmitted from the input unit 75. When the machining amount Q is equal to or grater than the indicated machining amount A, the machining-amount determining unit 78 transmits the oscillation end indication information to the oscillation control unit 40.

Figure 14:
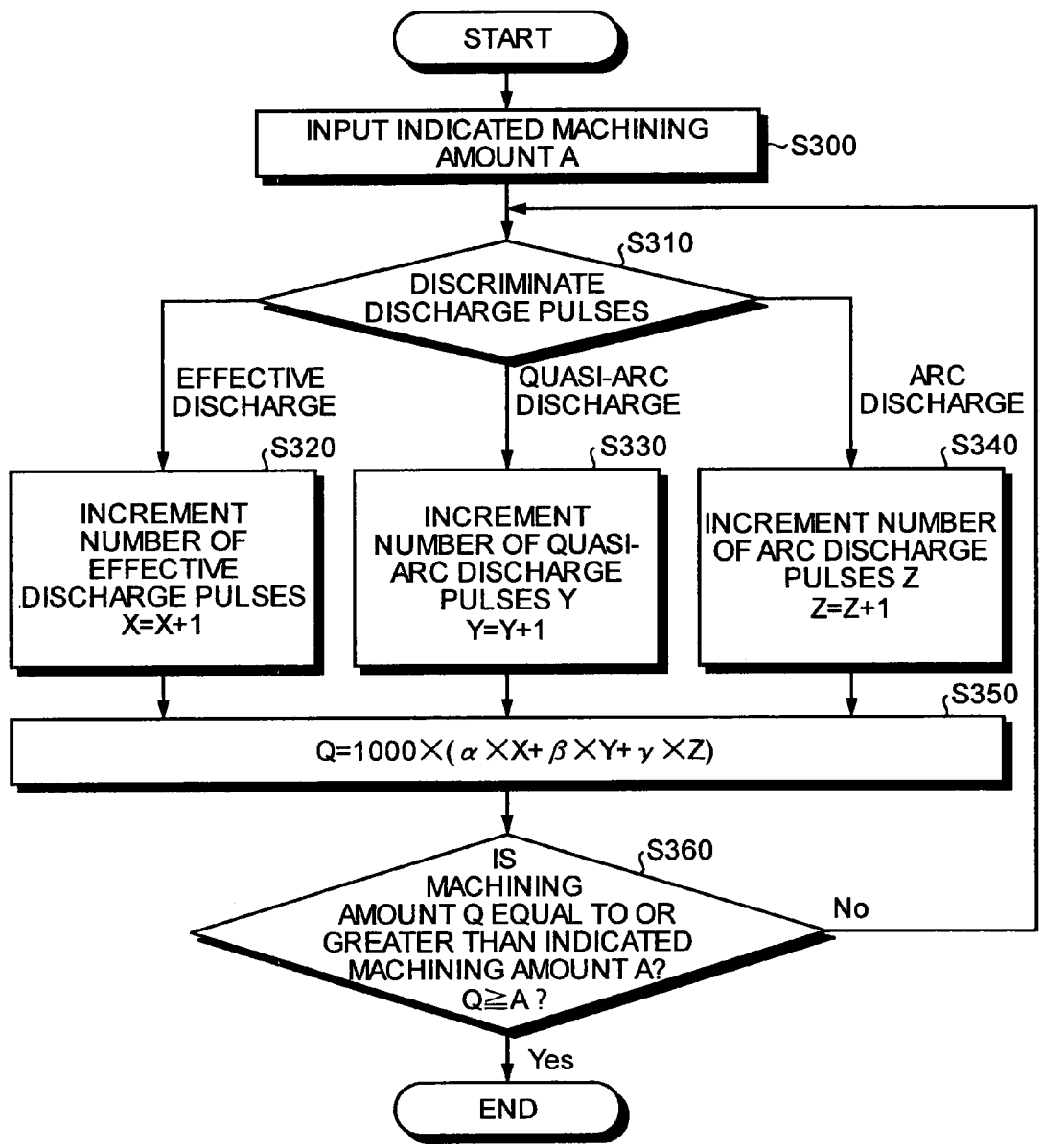
FIG. 14 is a flowchart of operation procedures of the electric-discharge machining apparatus according to the third embodiment.

FIG. 14 is a flowchart of operation procedures of the electric-discharge machining apparatus according to the third embodiment. The user of the electric-discharge machining apparatus 100 inputs the machining amount necessary for machining the workpiece 130 to the input unit 75 as the indicated machining amount A (at step S300). The indicated machining amount A input to the input unit 75 is transmitted to the machining-amount determining unit 78. The machining-amount determining unit 78 holds the indicated machining amount A. When the machining processing on the workpiece 130 starts, the discharge-pulse detecting unit 50 determines the detected discharge pulse is which pulse, the effective discharge pulse, the quasi-arc discharge pulse, or the arc discharge pulse (at step S310).

A method for detecting the effective discharge pulse, the quasi-arc discharge pulse, and the arc discharge pulse by the discharge-pulse detecting unit 50 will be explained. The discharge-pulse detecting unit 50 determines that the discharge pulse is the effective discharge pulses when detected high frequency components are distributed to a higher integrated output side (during a stable machining). The discharge-pulse detecting unit 50 determines that the discharge pulse is the arc discharge pulse when the detected high frequency components are distributed to a lower integrated output side (during an arc machining). The discharge-pulse detecting unit 50 determines that the discharge pulse is the quasi-arc discharge pulse when the detected high frequency components are distributed to an integrated output side between the effective discharge pulse and the arc discharge pulse (during an unstable machining). For example, the discharge-pulse detecting unit 50 is set as follows. When many high frequency components are distributed to integrated outputs 0 volt to 0.5 volt, the discharge-pulse detecting unit 50 determines that the discharge pulses are arc discharge pulses. When many high frequency components are distributed to integrated outputs 0.5 volt to 3 volts, the discharge-pulse detecting unit 50 determines that the discharge pulses are quasi-arc discharge pulses. When many high frequency components are distributed to integrated outputs 0.5 volt to 3 volts, the discharge-pulse detecting unit 50 determines that the discharge pulses are effective discharge pulses.

Referring back to FIG. 14, when detecting the effective discharge pulse, the discharge-pulse detecting unit 50 transmits the detection signal to the effective-discharge-pulse-number storing unit 81. The effective-discharge-pulse-number storing unit 81 increments the number of effective discharge pulses x by one in response to the detection signal from the discharge-pulse detecting unit 50 (at step S320), and stores the incremented number. Upon incrementing number of effective discharge pulses x, the effective-discharge-pulse-number storing unit 81 transmits the incremented number of effective discharge pulses x to the machining-amount converting unit 79.

When detecting the quasi-arc discharge pulse, the discharge-pulse detecting unit 50 transmits the detection signal to the quasi-arc-discharge-pulse-number storing unit 82. The quasi-arc-discharge-pulse-number storing unit 82 increments the number of quasi-arc discharge pulses y by one in response to the detection signal from the discharge-pulse detecting unit 50 (at step S330), and stores the incremented number. Upon incrementing number of quasi-arc discharge pulses y, the quasi-arc-discharge-pulse-number storing unit 82 transmits the incremented number of quasi-arc discharge pulses y to the machining-amount converting unit 79.

When detecting the arc discharge pulse, the discharge-pulse detecting unit 50 transmits the detection signal to the arc-discharge-pulse-number storing unit 83. The arc-discharge-pulse-number storing unit 83 increments the number of quasi-arc discharge pulses z by one in response to the detection signal from the discharge-pulse detecting unit 50 (at step S340), and stores the incremented number. Upon incrementing number of arc discharge pulses z, the arc-discharge-pulse-number storing unit 83 transmits the incremented number of arc discharge pulses z to the machining-amount converting unit 79.

When receiving the number of discharge pulses from one of the effective-discharge-pulse-number storing unit 81, the quasi-arc-discharge-pulse-number storing unit 82, and the arc-discharge-pulse-number storing unit 83, the machining-amount converting unit 79 calculates the machining amount Q based on a machining amount α per effective discharge pulse, a machining amount β per quasi-arc discharge pulse, or a machining amount γ per arc discharge pulse as represented by Eq. (11). In addition, the machining-amount converting unit 79 transmits the calculated machining amount Q to the machining-amount determining unit 78 (at step S350).

$$Q = 1000 \times (\alpha \cdot x + \beta \cdot y + \gamma \cdot z) \quad (11)$$

A method for calculating the machining amount α per effective discharge pulse, the machining amount β per quasi-arc discharge pulse, or the machining amount γ per arc discharge pulse will be explained. It is assumed that the number of pulses in an nth machining test (where n is a natural number) is the number of effective discharge pulses Xn, the number of quasi-arc discharge pulses Yn, or the number of arc discharge pulses Zn (where n is a natural number). It is also assumed that a total machining amount after the nth machining test is a total machining amount Wn. In this case, a relationship among the machining amount α per effective discharge pulse, the machining amount β per quasi-arc discharge pulse, the machining amount γ per arc discharge pulse, the number of effective discharge pulses Xn, the number of quasi-arc discharge pulses Yn, the number of arc discharge pulses Zn, and the total machining amount Wn is expressed by the following Eq. (12).

$$\begin{pmatrix} X1 & Y1 & Z1 \\ X2 & Y2 & Z2 \\ \cdots & \cdots & \cdots \\ Xn & Yn & Zn \end{pmatrix} \begin{pmatrix} \alpha \\ \beta \\ \gamma \end{pmatrix} = \begin{pmatrix} W1 \\ W2 \\ W3 \end{pmatrix} \quad (12)$$

Accordingly, by conducting machining tests a plurality of times and reducing the Eq. (12) in advance, the machining amount α per effective discharge pulse, the machining amount β per quasi-arc discharge pulse, and the a machining amount γ per arc discharge pulse can be obtained. The machining amount α per effective discharge pulse, the machining amount β per quasi-arc discharge pulse, and the machining amount γ per arc discharge pulse are set to the machining-amount converting unit 79 in advance.

The machining-amount converting unit 79 calculates the machining amount Q based on the machining amount α per effective discharge pulse, the machining amount β per quasi-arc discharge pulse, or the machining amount γ per arc discharge pulse, and on the number of effective discharge pulses x, the number of quasi-arc discharge pulses y, or the number of arc discharge pulses z.

The machining-amount determining unit 78 compares the indicated machining amount A transmitted from the input unit 75 with the machining amount Q (at step S360). When the machining amount Q is equal to or greater than the indicated machining amount A, the machining-amount determining unit 78 transmits the oscillation end indication information to the oscillation control unit 40 so as to finish the machining processing. The oscillation control unit 40 controls the pulse oscillation unit 30 to finish the discharge machining processing.

As explained above, according to the third embodiment, even when an output of the discharge pulse is unstable, since the machining amount Q is calculated by counting pulse numbers for each kind of pulse, an accurate machining processing can be performed.

A fourth embodiment of the present invention will be explained with reference to FIGS. 1, 15, and 16. According to the fourth embodiment, the indicated machining amount A is corrected based on an influence of the machining amount in a previous ($N^{th}$) machining processing on the machining amount in a next $(N+1)^{th}$ machining processing when a plurality of machining processings are performed. Furthermore, in one machining processing, a plurality of electric conditions are used. A case that electric conditions before change are for a course machining and those after change are for a finishing machining will be explained herein.

Figure 15:
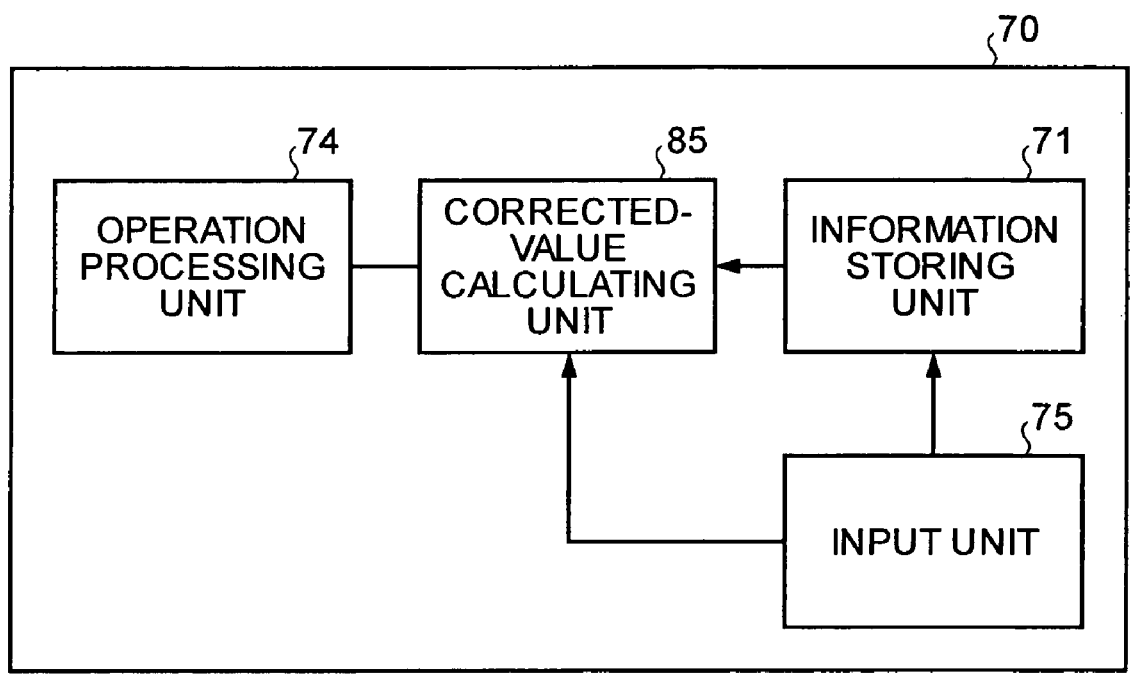
FIG. 15 is a functional block diagram that depicts functions of the machining-amount calculating unit according to a fourth embodiment.

FIG. 15 is a block diagram that depicts functions of the machining-amount calculating unit according to the fourth embodiment. Among all constituent elements shown in FIG. 15, the constituent elements that attain the same functions as those of the machining-amount calculating unit according to the first embodiment shown in FIG. 2 are designated with like reference signs, respectively, and redundant explanations thereof will be omitted.

As shown in FIG. 15, the machining-amount calculating unit 70 is configured by the information storing unit (memory unit) 71, a corrected-value calculating unit 85, the operation processing unit 74, and the input unit 75. The information storing unit 71 stores the indicated machining amount A and an indicated machining amount C in a machining processing performed just before the present machining processing.

The corrected-value calculating unit 85 corrects the present indicated machining amount A based on the indicated machining amount C transmitted from the information storing unit 71. The corrected-value calculating unit 85 thus obtains a corrected machining amount B2 from the indicated machining amount A. The operation processing unit 74 converts the corrected machining amount B2 into the numbers of indicated effective discharge pulses N2 and N3 based on the corrected machining amount B2 from the corrected-value calculating unit 85 and on a preset machining amount D for the finishing machining. The number of indicated effective discharge pulses N3 is the number of discharge pulses for the finishing machining, whereas the number of indicated effective discharge pulses N2 is the number of discharge pulses for the rough machining.

Figure 16:
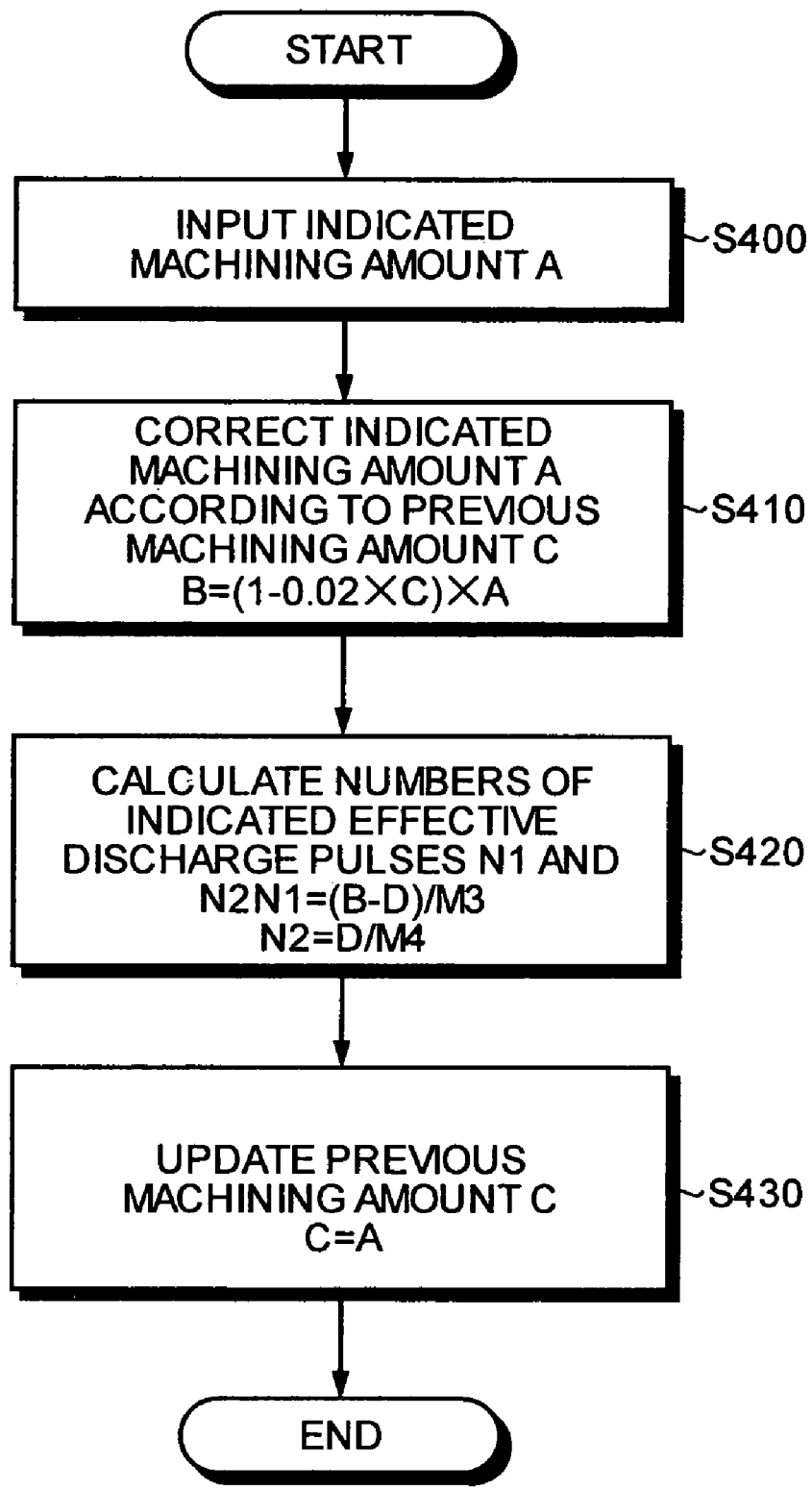
FIG. 16 is a flowchart of operation procedures of the electric-discharge machining apparatus according to the fourth embodiment.

FIG. 16 is a flowchart of operation procedures of the electric-discharge machining apparatus according to the fourth embodiment. The user of the electric-discharge machining apparatus 100 inputs the indicated machining amount A to the input unit 75 via the input unit 75 (at step S400). The indicated machining amount A input to the input unit 75 is transmitted to the information storing unit 71, and the information storing unit 71 stores the indicated machining amount A.

The influence of the machining amount in the previous machining processing on that in the next machining processing when a plurality of machining processings are performed will be explained. FIG. 17 depicts electric conditions for the rough machining and those for the finishing machining. FIG. 18 depicts the relationship between the machining amount in the previous rough machining and that in the next (present) rough machining.

It is assumed that the number of effective discharge pulses in the finishing machining is set to a certain number, for example, 42106. As shown in FIG. 18, while the machining amount in the previous rough machining is variously changed, the machining amount in the present rough machining is set to a certain number, namely, 13595. As shown in FIG. 18, when the machining amount (the number of effective discharge pulses) in the previous rough machining is large, the machining amount (the number of effective discharge pulses) in the present rough machining tends to be large. Namely, the number of effective discharge pulses in the finishing machining is always constant. Therefore, when a ratio of the number of effective discharge pulses in the rough machining to that in the finishing machining increases in the previous machining processing, the machining amount in the present finishing machining increases. For this reason, unless the number of effective discharge pulses in the present rough machining is corrected according to that in the previous rough machining, the accurate machining processing cannot be ensured.

A case that the corrected-value calculating unit 85 corrects the indicated machining amount A under the conditions of the relationship shown in FIG. 18 between the machining amount in the previous rough machining and that in the present rough machining will be explained. It is, therefore, assumed that the machining amount D for the finishing machining is set to a predetermined value in advance.

Referring back to FIG. 18, the corrected-value calculating unit 85 corrects the presently indicated machining amount A based on the previously indicated machining amount C transmitted from the information storing unit 71, thereby obtaining the corrected machining amount B2. The corrected machining amount B2 is calculated as represented by, for example, Eq. (13) (at step S410).

$$B2 = (1 - 0.02 \times C) \times A \quad (13)$$

The operation processing unit 74 calculates the number of indicated effective discharge pulses N2 for the finishing machining and the number of indicated effective discharge pulses N3 for the rough machining based on the corrected machining amount B2 transmitted from the corrected-value calculating unit 85 and on the preset machining amount D for the finishing machining. The number of indicated effective discharge pulses N2 is calculated as represented by Eq. (14), and the number of indicated effective discharge pulses N3 is calculated as represented by Eq. (15) (at step S420). In the Eqs. (14) and (15), M3 denotes a machining amount per effective discharge pulse for the rough machining and M4 denotes a machining amount per effective discharge pulse for the finishing machining.

$$N2 = (B-D)/M3 \quad (14)$$

$$N3 = D/M4 \quad (15)$$

The numbers of indicated effective discharge pulses N2 and N3 obtained by the operation processing unit 74 are transmitted to the machining-pulse-number calculating unit 60. The pulse oscillation unit 30 starts the discharge machining processing on the workpiece 130 under the conditions for the rough machining. The discharge-pulse detecting unit 50 detects effective discharge pulses generated in the gap between the electrode 120 and the workpiece 130, and transmits pulse detection signals to the machining-pulse-number calculating unit 60.

The machining-pulse-number calculating unit 60 counts pulse detection signals transmitted from the discharge-pulse detecting unit 50. In addition, the machining-pulse-number calculating unit 60 compares the counted number of effective discharge pulses with the number of indicated effective discharge pulses N2 transmitted from the operation processing unit 74 at real time. When the counted number of effective discharge pulses transmitted from the discharge-pulse detecting unit 50 matches the number of indicated effective discharge pulses N2 transmitted from the operation processing unit 74, the machining-pulse-number calculating unit 60 transmits an oscillation end indication to the oscillation control unit 40 to stop the pulsed discharge for the rough machining.

The pulse oscillation unit 30 starts the discharge machining processing on the workpiece 130 under the conditions for the finishing machining. The discharge-pulse detecting unit 50 detects effective discharge pulses generated in the gap between the electrode 120 and the workpiece 130, and transmits pulse detection signals to the machining-pulse-number calculating unit 60.

The machining-pulse-number calculating unit 60 counts pulse detection signals transmitted from the discharge-pulse detecting unit 50. In addition, the machining-pulse-number calculating unit 60 compares the counted number of effective discharge pulses with the number of indicated effective discharge pulses N3 transmitted from the operation processing unit 74 at real time. When the counted number of effective discharge pulses transmitted from the discharge-pulse detecting unit 50 matches the number of indicated effective discharge pulses N3 transmitted from the operation processing unit 74, the machining-pulse-number calculating unit 60 transmits an oscillation end indication to the oscillation control unit 40 to stop the pulsed discharge for the finishing machining, thus finishing the discharge machining processing.

After the discharge machining processing on the workpiece 130 is finished, the indicated machining amount A for the workpiece 130 stored in the information storing unit 71 is transmitted to the information storing unit 71. The information storing unit 71 changes the previously indicated machining amount C already stored therein to the indicated machining amount A, and stores the changed machining amount (at step S430).

In the fourth embodiment, the electric charge machining apparatus is configured so that the machining amount D for the finishing machining is constant and that the indicated machining amount A is corrected based on the machining amount for the previous rough machining. Alternatively, the electric charge machining apparatus can be configured to correct the indicated machining amount A based on the ratio of the machining amount for the rough machining to that for the finishing machining.

As can be seen, according to the fourth embodiment, the indicated machining amount A is corrected so as to lessen the influence of the machining amount in the previous rough machining on the machining amount in the present rough machining. Therefore, even if it is necessary to machine the workpiece 130 under a plurality of machining and electric conditions for correctly machining the workpiece 30, the accurate machining processing can be ensured.

The electric-discharge machining apparatus can be configured to include all the constituent elements of the electric-discharge machining apparatuses explained in the first to the fourth embodiments. In this case, the machining-amount converting unit 79 converts the discharge pulses detected by each of the effective-discharge-pulse-number storing unit 81, the quasi-arc-discharge-pulse-number storing unit 82, and the arc-discharge-pulse-number storing unit 83 into the number of effective discharge pulses based on how many pulses for each of the number of quasi-arc discharge pulses and the arc discharge pulses the machining amount per pulse of the effective discharge pulses corresponds to. The indicated machining amount A is corrected based on the accumulated machining amount S, the facing area T, and the previously indicated machining amount C. The machining processing is finished when the number of effective discharge pulses obtained by the machining-amount converting unit 79 reaches the corrected indicated machining amount.

As explained above, the indicated machining amount A is corrected based on a usage history of the electrode 120, and the workpiece 2 is machined based on the corrected machining amount B1. The present invention, therefore, exhibits the advantage in that the workpiece 2 can be accurately machined irrespective of the actual machining amount changed according to the usage history of the electrode 120.

INDUSTRIAL APPLICABILITY

As explained above, the electric-discharge machining apparatus according to the present invention is suitable for an electric-discharge machining apparatus that can accurately machine a workpiece by as much as a set machining amount.

The invention claimed is:

1. An electric-discharge machining apparatus for machining a workpiece by an electric discharge generated between a machining electrode and the workpiece, the electric-discharge machining apparatus comprising:
   a correcting unit that corrects an input machining amount for machining the workpiece, based on a usage history of the machining electrode; and
   a control unit that controls a machining processing on the workpiece based on the corrected machining amount.

2. The electric-discharge machining apparatus according to claim 1, wherein
   the correcting unit includes an accumulated-machining-amount calculating unit that calculates an accumulated machining amount with which the machining processing is performed by the machining electrode, and
   the correcting unit corrects the machining amount based on the accumulated machining amount.

3. The electric-discharge machining apparatus according to claim 2, wherein the correcting unit compares the accumulated machining amount to a threshold and corrects the input machining amount based on said comparison.

4. The electric-discharge machining apparatus according to claim 2, wherein the accumulated machining amount is reset once the electrode is replaced with a new electrode.

5. The electric-discharge machining apparatus according to claim 2, wherein the accumulated machining amount is an amount machined by the electrode during a lifetime of the electrode.

6. The electric-discharge machining apparatus according to claim 2, wherein, when the accumulated machining amount is below a first threshold, the correcting unit corrects the input machining amount based on equation: $(0.75+0.20*S/Th)*A$, where S is the accumulated machining amount, Th is the first threshold, and A is the input machining amount.

7. The electric-discharge machining apparatus according to claim 6, wherein:
   when the accumulated machining amount is below a second threshold and greater than or equal to the first threshold, the correcting unit corrects the input machining amount based on equation: $(0.95+0.05*S/Th2)*A$, where S is the accumulated machining amount, Th2 is the second threshold, and A is the input machining amount, and
   when the accumulated machining amount is equal to or above the second threshold, the correcting unit corrects the input machining amount based on equation: $B1=A$, where B1 is the corrected machining amount and A is the input machining amount.

8. The electric-discharge machining apparatus according to claim 1, wherein
   the correcting unit includes a storing unit that stores, when a machining processing including a plurality of machining conditions is performed a plurality of times, information on a machining amount in a previous machining processing performed by the machining electrode, as previous machining amount information, and
   the correcting unit corrects the machining amount based on the previous machining amount information stored in the storing unit.

9. The electric-discharge machining apparatus according to claim 8, wherein the previous machining amount information is a ratio of a machining amount per a single time of machining processing to a machining amount under a predetermined machining condition included in a single time of machining processing.

10. The electric-discharge machining apparatus according to claim 8, wherein the previous machining amount information is a machining amount under a predetermined machining condition included in a single time of machining processing.

11. The electric-discharge machining apparatus according to claim 1, wherein the control unit that controls the machining processing of the workpiece by setting machining conditions for the machining processing based on the corrected machining amount, and wherein the input machining amount is a value indicating an amount of the workpiece that needs to be machined.

12. The electric-discharge machining apparatus according to claim 1, further comprising input unit receiving user input indicating the input machining amount, which is an amount machining needed for the workpiece.

13. The electric discharge machining apparatus according to claim 12, wherein the calculated machining amount is based on all of the detected discharge pulses, and wherein each of the detected discharge pulses contributes to the machining of the workpiece.

14. The electric discharge machining apparatus according to claim 1, wherein the input machining amount is workpiece removal amount per pulse.

15. An electric-discharge machining apparatus for machining a workpiece by an electric discharge generated between a machining electrode and the workpiece, the electric-discharge machining apparatus comprising:
   a correcting unit that corrects an input machining amount for machining the workpiece, based on a shape of the machining electrode and on a machining depth with which the machining electrode machines the workpiece; and
   a control unit that controls a machining processing on the workpiece based on the corrected machining amount.

16. The electric-discharge machining apparatus according to claim 15, wherein the correcting unit calculates the machining depth based on the input machining amount and the shape of the machining electrode.

17. An electric-discharge machining apparatus for machining a workpiece by an electric discharge generated between a machining electrode and the workpiece, the electric-discharge machining apparatus comprising:
   a discharge-pulse detecting unit that detects a plurality of discharge pulses and for each detected discharge pulse determines a type of pulse from a plurality of pulse types by determining a magnitude of a high frequency component of the respective discharge pulse;

a calculating unit that calculates a machining amount for the workpiece under machining based on a machining amount per a single pulse corresponding to each of the plurality of pulse types and a number of discharge pulses detected for said each of the plurality of pulse type; and a control unit that controls a machining processing on the workpiece based on an input machining amount for machining the workpiece and the calculated machining amount.

18. The electric discharge machining apparatus according to claim 17, wherein the control unit compares the input machining amount with the calculated machining amount and determines that the machining process is complete when the calculated machining amount is equal to or greater than the input machining amount.

19. The electric discharge machining apparatus according to claim 17, wherein, the machining amount corresponding to the single pulse varies depending on the type of said single pulse.

20. The electric discharge machining apparatus according to claim 17, wherein the input machining amount is workpiece removal amount per pulse.

21. A method for machining a workpiece by an electric discharge generated between a machining electrode and the workpiece, the method comprising:

correcting an input machining amount for machining the workpiece, based on a usage history of the machining electrode; and controlling a machining processing on the workpiece based on the corrected machining amount.

* * * * *